M. WILBUSCHEWITSCH.
PROCESS OF MANUFACTURING CATALYSTS.
APPLICATION FILED JULY 19, 1911.
1,029,901. Patented June 18, 1912.
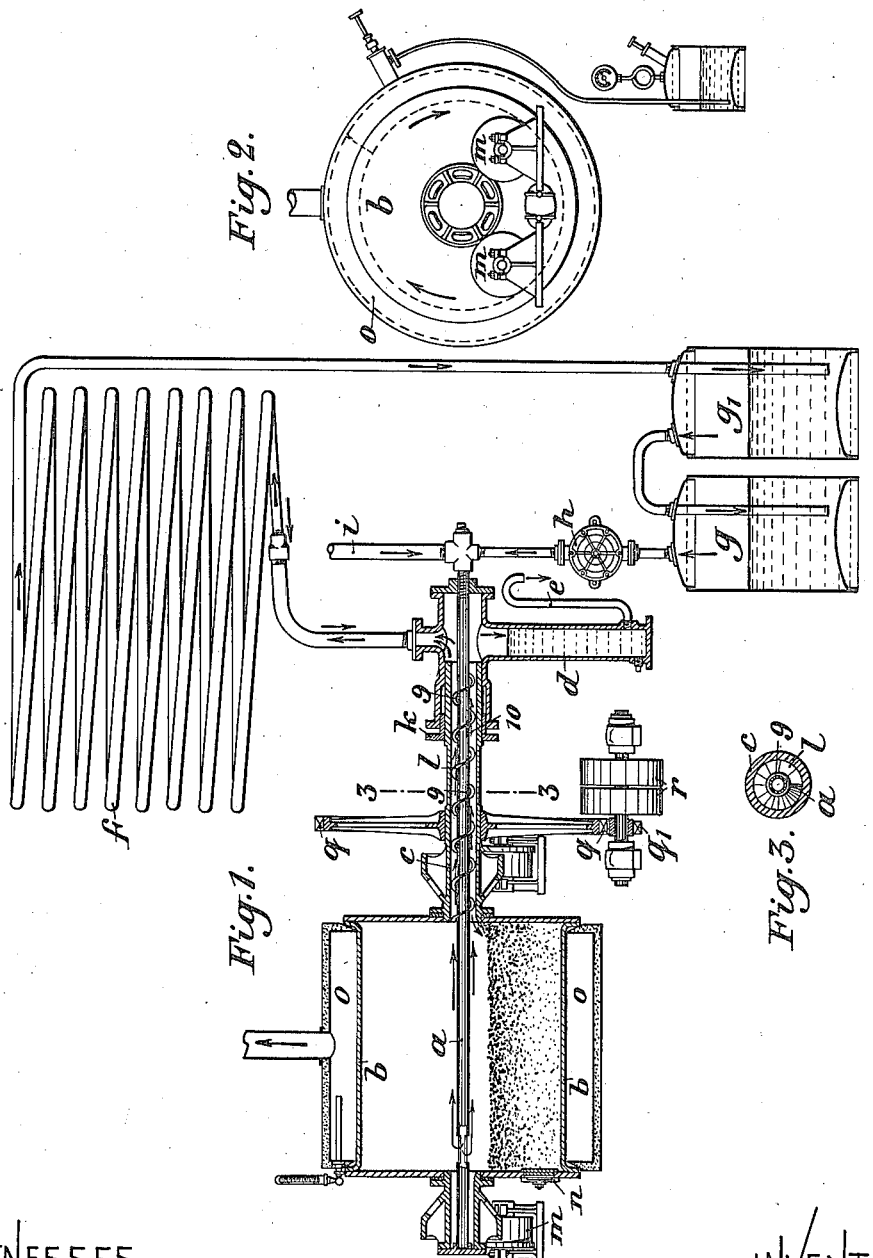

UNITED STATES PATENT OFFICE.

MOSE WILBUSCHEWITSCH, OF NISCHNINOVGOROD, KANAVINO, RUSSIA.

PROCESS OF MANUFACTURING CATALYSTS.

1,029,901. Specification of Letters Patent. Patented June 18, 1912.

Original application filed January 12, 1911, Serial No. 602,322. Divided and this application filed July 19, 1911. Serial No. 639,451.

*To all whom it may concern:*

Be it known that I, MOSE WILBUSCHEWITSCH, a subject of the Russian Emperor, and resident of Nischninovgorod, Kanavino, Russia, have invented certain new and useful Improvements in Processes of Manufacturing Catalysts, and of which the following is a specification.

My invention relates to improvements in a process of manufacturing a catalyst which is adapted to be used in various contact processes, and which is particularly designed for use in processes of reducing and oxidizing fats. And the object of the improvements is to provide a process whereby a particularly active catalyst is produced.

In the preferred form of the process the catalyst is prepared in the following way: A suitable contact substance, such for example as copper, iron, nickel, or the like, is dissolved in an acid, for instance in sulfuric acid. This solution which preferably has a specific gravity of 10 to 14° Baumé is mixed with about double its weight of an inorganic substance, such as clay, asbestos, pumice-stone, kieselguhr, or the like from which all the soluble matter is first removed by an acid. The mixture is then treated with carbonate of soda whereby the metal salt is converted into the carbonate. The carbonate is heated to about 500° C. and thereby transformed into the oxid, and the oxid is reduced by hydrogen so as to form a finely divided pyrophoric metal which envelops the inorganic carrier. This product is ground with oil, until a strongly viscous liquid similar in character to an emulsion is produced.

In order that my invention may more clearly be understood an apparatus suitable for carrying the process into effect is shown in the accompanying drawings, in which the same letters of reference are used in all the views to indicate corresponding parts.

In said drawings Figure 1, is a diagrammatical side view partly in section, Fig. 2, is an end view seen from the left in Fig. 1, and Fig. 3, is a cross-section taken on the line 3—3 of Fig. 1.

In the example shown in the drawings the apparatus consists of a cylindrical drum $b$ mounted to rotate on rollers $m$ and provided with a heating jacket $o$. The previously prepared mixture of the nickel or other carbonate and the inorganic carrier is charged into the said retort through an inlet opening $n$. To one of the end plates of the drum a tubular shaft $c$ is secured which with its free end is guided in a stuffing box $k$ supported in a lateral stud of a tubular receptacle $d$. On the said shaft a spur gear $q$ is mounted which is in mesh with a pinion $q^1$ adapted to be rotated by means of a belt pulley $r$. By means of the gearing $q^1$, $q$ the drum $b$ is slowly rotated, and during such rotation it is heated to about 500° C. Hydrogen is then forced into the drum through a pipe $a$ located coaxially within the hollow shaft $c$ and connected at one end to a tube $i$. The hydrogen passes through the material to be reduced, and from the latter it is successively conducted through an automatically operating dust collector 9 connected to the retort, a cooling worm $f$, and purifying vessels $g$, $g^1$ containing respectively acid and caustic soda lye, or a similar purifying medium. After thus being regenerated it is returned into the process by means of a pump $h$. The water produced by the reduction is condensed in the coil $f$ and is dropped from the coil $f$ into the vessel $d$ from which it is withdrawn through an overflow $e$. When the reduction is finished no further water flows from the vessel $d$.

In the example shown the dust collector 9 by means of which the hydrogen escaping from the drum is prevented from carrying along particles of dust is constructed in the form of a worm conveyer $l$. The dust moves through the hollow shaft $c$ in the direction of the arrow 10 and owing to the difference in the speed of the gas and dust the latter is deposited on the bottom of the shaft $c$, and is conveyed back into the retort by the worm $l$.

I claim:

1. The herein described process of producing a catalyst which consists in dissolving a suitable metallic contact-substance in an acid, admixing therewith an insoluble porous inorganic substance, transforming the metal-salt into the carbonate by means of carbonate of soda, heating the base impregnated with carbonate of the catalytic metal to a temperature sufficient to convert the carbonate into oxid, and reducing the oxid obtained thereby to form a base and a pyrophoric metal which envelops the inorganic carrier, and grinding the said pyrophoric metal with oil to form a mixture similar in character to an emulsion.

2. The herein described process of producing a catalyst which consists in dissolving a suitable metallic contact-substance in an acid, admixing therewith about double the amount of an insoluble porous inorganic substance, transforming the metal salt into the carbonate, heating the base impregnated with carbonate of the catalytic metal to a temperature sufficient to convert the carbonate into oxid, and reducing the oxid obtained thereby to form a base and a pyrophoric metal which envelops the inorganic carrier, and grinding the said pyrophoric metal with oil to form a mixture similar in character to an emulsion.

3. The herein described process of producing a catalyst which consists in dissolving a suitable metallic contact-substance in an acid, admixing therewith a solid inorganic substance, transforming the metal-salt into the carbonate, heating the base impregnated with carbonate of the catalytic metal to a temperature sufficient to convert the carbonate into oxid, reducing the oxid obtained thereby by means of hydrogen to form a base and a pyrophoric metal which envelops the inorganic carrier, and grinding the said pyrophoric metal with oil to form a mixture similar in character to an emulsion.

In testimony, that I claim the foregoing as my invention, I have signed my name in presence of two subscribing witnesses.

MOSE WILBUSCHEWITSCH.

Witnesses:
HENRY HASPER,
WOLDEMAR HAUPT.